United States Patent [19]
Hartung

[11] 3,784,104
[45] Jan. 8, 1974

[54] GAS COOLER AND ATOMIZING SPRAY NOZZLE THEREOF

[75] Inventor: Charles A. Hartung, Kearny, Ariz.

[73] Assignee: Kennecott Copper Corporation, New York City, N.Y.

[22] Filed: May 1, 1972

[21] Appl. No.: 248,967

[52] U.S. Cl.......... 239/102, 239/288.5, 239/DIG. 20
[51] Int. Cl............................................. B05b 3/14
[58] Field of Search............... 239/102, 288, 288.5, 239/DIG. 20

[56] References Cited
UNITED STATES PATENTS

| | | | |
|---|---|---|---|
| 3,371,869 | 3/1968 | Hughes | 239/102 |
| 3,169,508 | 2/1965 | Rich | 239/102 |
| 1,035,127 | 8/1912 | Windehuller | 239/288.5 |
| 3,297,255 | 1/1967 | Fortman | 239/102 |
| 3,638,859 | 2/1972 | MacFarlane | 239/102 |

*Primary Examiner*—Lloyd L. King
*Attorney*—Philip A. Mallinckrodt et al.

[57] ABSTRACT

The usual vertical reactor vessel of a conventional gas cooler of a fluosolids or other dust-generating system has combined therewith special atomizing spray nozzles constructed and arranged in the reactor vessel to eliminate caking, on interior walls of the reactor vessel, of particulate solids suspended in the entering hot gas, and, thus, the necessity of digging out the caked solids at frequent intervals. The spray nozzles are of acoustic resonance type having respective resonator cups spaced from air-water-mixing nozzle discharge to interrupt, atomize, and disseminate the air-water streams. In accordance with the invention, the space between nozzle discharge and resonator cup of such a nozzle is protected against induction of particulate solids by a cylindrically tubular shield, thereby protecting nozzle parts against abrasion and the air-water stream against entrainment of solids. In contrast to conventional gas coolers, relatively few nozzles of relatively great capacity are positioned in the top only of the reactor vessel, the remainder of the reactor vessel being free of spray nozzles.

3 Claims, 5 Drawing Figures

PATENTED JAN 8 1974 3,784,104
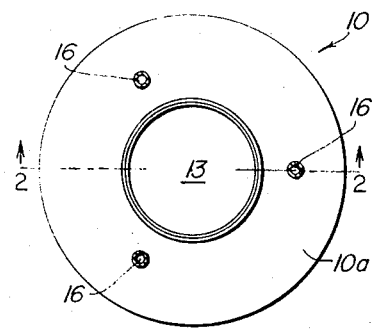
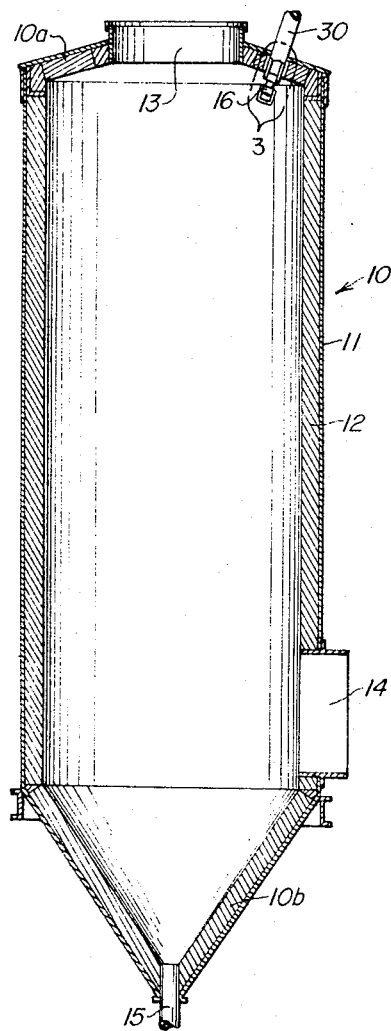
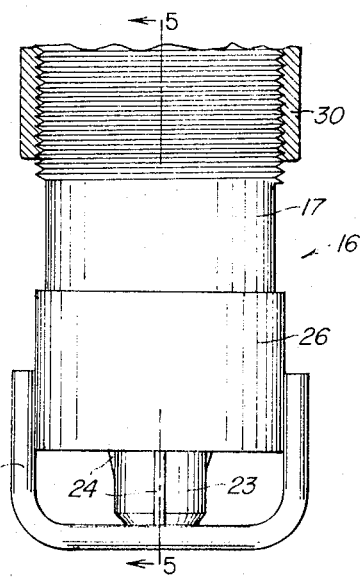
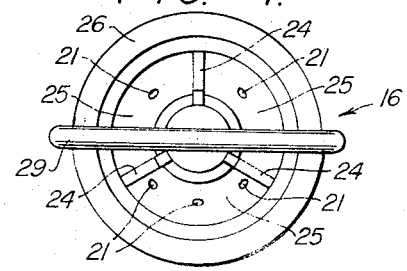
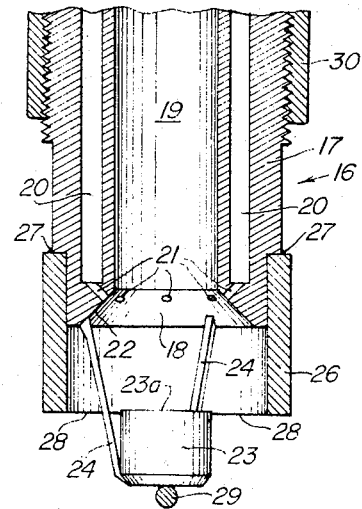

3,784,104

GAS COOLER AND ATOMIZING SPRAY NOZZLE THEREOF

BACKGROUND OF THE INVENTION

1. Field

The invention is in the field of fluosolids and similar systems that generate dust in hot gases and is particularly concerned with apparatus employed to cool the hot, dust-carrying, exhaust gases from such systems.

2. State of the Art

Exhaust gases from a conventional fluosolids roaster are customarily passed through a gas cooler in the form of a vertical reactor equipped with many nozzles located in the top and side walls for projecting sprays of water into such hot gases. The gases normally carry particulate solids, which have given trouble by caking against the interior walls of the reactor and requiring the equipment to be shut down frequently so the caked material can be dug out.

A form of atomizing nozzle of particular utility from the standpoint of atomizing effectiveness has a central passage for air surrounded by an annular passage for water and jet orifices through which the water is injected into the air stream in a mixing zone at the discharge end of the nozzle. Spaced from the mixing zone outwardly of the nozzle is a resonator cup, onto which at least a portion of the stream of mixed air and water is projected for abrupt reversal in direction of flow and resulting atomization and dissemination under sonic conditions. The resonator cup is attached to the nozzle by legs, which are widely spaced to provide exits for the atomized spray. However these legs suffer considerable abrasion in a gas cooler of the type concerned, necessitating frequent replacement.

SUMMARY OF THE INVENTION

In accordance with the invention, an open-ended cylindrically tubular shield is attached to an atomizing nozzle of the type described in position laterally surrounding the usual resonator cup legs so as to close the spray exit openings therebetween and direct the spray through an annular opening at the discharge end of the nozzle approximately flush with the rim of and closely surrounding the resonator cup. This has been found to minimize abrasion of the nozzle and to help prevent caking of particulate solids in the reactor vessel, probably because induction of particulate solids into the air-water stream and into the atomized spray in the nozzle is prevented. Further prevention of caking is accomplished by elimination of the usual multiplicity of spray nozzles in the side walls of the reaction vessel and supplying the cooling water substantially solely through a plurality of the special atomizing spray nozzles of high capacity directed downwardly in the top wall of the reaction vessel.

THE DRAWING

A construction constituting the best mode presently contemplated of carrying out the invention in actual practice is illustrated in the accompanying drawing, in which:

FIG. 1 is a top plan view of the reaction vessel of a gas cooler of a typical fluosolids system embodying the invention;

FIG. 2, a vertical section taken on the line 2—2 of FIG. 1;

FIG. 3, an enlarged view in side elevation of the atomizing spray nozzle detail enclosed by the line 3—3 of FIG. 2;

FIG. 4, an elevational view of the discharge end of the nozzle of FIG. 3 drawn to the same larger scale; and FIG. 5, a vertical section taken along the line 5—5 of FIG. 3.

DETAILED DESCRIPTION OF THE ILLUSTRATED EMBODIMENT

In the form illustrated, the gas cooler is largely of conventional construction comprising a vertical reactor vessel 10 made up of an exterior cylindrical steel shell 11 lined with refractory material 12. Hot gas from a fluosolids roaster (not shown) enters through inlet port 13 centrally of the top wall 10a and cooled gas exits through a discharge port and connecting passage 14 into a cooler up-leg (not shown). The bottom 10b of reactor vessel 10 is of inverted conical formation, having a screw conveyor 15 at its apex for continuously discharging particulate solids as they drop from the gas stream.

All of this is standard construction, except that numerous jet spray nozzles are normally provided in circumferential series at intervals along the length of the reactor vessel through the side walls thereof.

In accordance with the invention, such jet spray nozzles are eliminated and a plurality of high capacity, sonic type, atomizing spray nozzles 16 of special construction are provided in top wall 10a in place of the several jet nozzles usually provided in such top wall.

In the form illustrated, the spray nozzles 16 are conventional insofar as they each comprise a nozzle body 17 of elongate generally cylindrical formation defining an air-water mixing zone 18 at one end thereof, an air supply passage 19 extending from end to end of such body axially thereof to a discharge termination centrally of the mixing zone, and an annular series of water supply passages 20 concentric with the air supply passage and extending from the supply end of the nozzle to communication with respective jet passages 21 circumferentially of and arranged to discharge into the mixing zone from a bevel end wall 22. Such a conventional spray nozzle has a resonator cup 23 spaced outwardly from the mixing zone 18 to receive at least a part of the stream of mixed air and water projected from the mixing zone and to interrupt and atomize it. Resonator cup 23 is secured to nozzle body 17 by slender legs 24 so the area lying between mixing zone and cup is substantially open circumferentially thereof, see 25, FIGS. 4 and 5, for dissemination of the atomized spray. These slender legs 24 and the resonator cup normally suffer so much abrasion as to render this type of nozzle impractical in a gas cooler or the like where the gas carries particulate solids.

In accordance with the invention, it was theorized that the induction of particulate solids by the streams of mixed air and water caused the greatest part of the difficulty experienced by abrasion and also tended to cause similar undesirable caking of particulate solids as was experienced with the spray nozzle arrangement of the conventional gas cooler. Thus, an imperforate cylindrically tubular shield 26 was secured, as by welds 27, to the discharge end of nozzle body 17 so as to surround the circumferentially open area between mixing zone and cup in circumferentially spaced relation thereto and define an annular discharge orifice 28 for atomized spray approximately flush with and closely surrounding the rim 23a of resonator cup 23, see FIG. 5. This was found to overcome the difficulties previously experienced and to render the entire gas cooler combination effective to do the job it was intended to do.

It is preferred to provide a retention yoke 29 for resonance cup 23 in the form of a U-shaped bar secured to both cup 23 and shield 26, so that the cup will continue to be held securely in position even if wear over an extended period of time weakens or breaks the legs 24 normally provided with such a nozzle. If desired, the nozzle can be fabricated originally without legs 24, the yoke 29 serving solely to hold resonance cup 23 in place.

A standard type of adapter 30 is commonly employed between the nozzle 16 and a conduit arrangement for supplying air and water to the nozzle.

Gas coolers of the invention can be used other than in fluosolids systems, e.g., for cooling particulate-solids-carrying gases exhausting from converters in a copper smelter, etc.

Whereas the invention is here illustrated and described with respect to a particular construction thereof, it should be realized that various changes may be made without departing from the inventive concepts set forth in the following claims.

I claim:

1. An atomizing spray nozzle, comprising a nozzle body defining an air-water mixing zone at the discharge end thereof; passage means for separately supplying air and water to said mixing zone; a resonator cup concentric with said mixing zone and spaced therefrom outwardly of the nozzle body for receiving and interrupting at least part of an air-water stream projected from said mixing zone; means securing said cup to the nozzle body so the area lying between mixing zone and cup is substantially open circumferentially thereof; and an imperforate cylindrically tubular shield surrounding said area between mixing zone and cup in circumferentially spaced relation thereto so as to define an annular discharge orifice for atomized spray approximately flush with and closely surrounding the rim of said cup.

2. An atomizing spray nozzle in accordance with claim 1, wherein the means securing the resonator cup to the nozzle body comprises a U-shaped yoke fastened to said cup and to the cylindrically tubular shield.

3. In combination, a closed, vertical, gas-cooler reaction vessel having an inlet centrally of its top wall for solid-particle-carrying gas to be cooled and an outlet near its bottom for the cooled gas; and a plurality of atomizing spray nozzles in accordance with claim 1 positioned in said top wall so as to discharge atomized air-water spray downwardly within said vessel, said spray nozzles being the only source of cooling water spray in said vessel.

* * * * *